LE ROY D. SHAFER & L. J. BOLLINGER.
FOCUSING DEVICE.
APPLICATION FILED MAY 14, 1918.
1,298,582.
Patented Mar. 25, 1919.
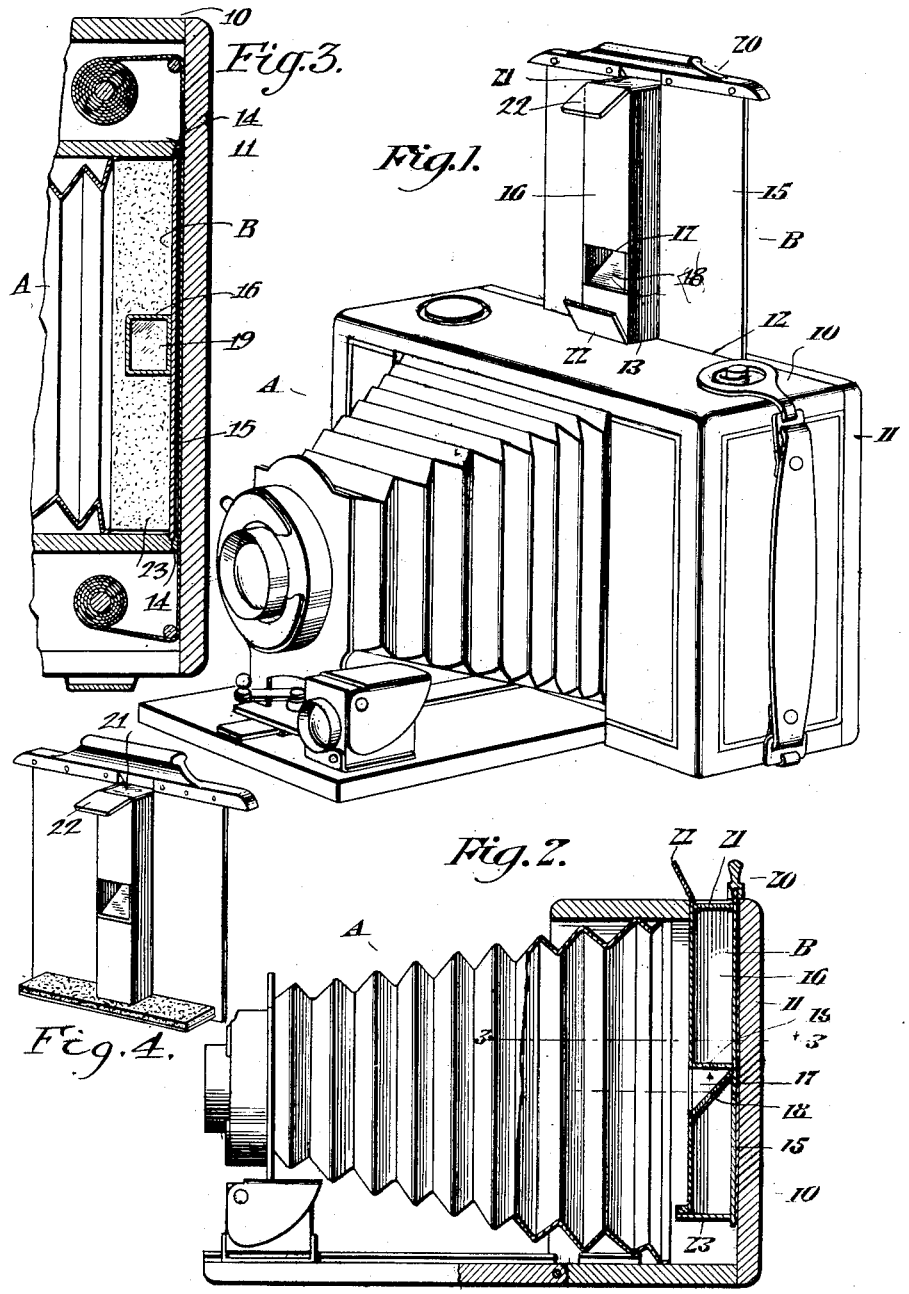
Witnesses
Inventor
L. D. Shafer &
L. J. Bollinger
By Victor J. Evans
Attorney

UNITED STATES PATENT OFFICE.

LE ROY D. SHAFER AND LESTER J. BOLLINGER, OF GROVE CITY, PENNSYLVANIA.

FOCUSING DEVICE.

1,298,582.　　　　　Specification of Letters Patent.　　Patented Mar. 25, 1919.

Application filed May 14, 1918. Serial No. 234,451.

*To all whom it may concern:*

Be it known that we, LE ROY D. SHAFER and LESTER J. BOLLINGER, citizens of the United States, residing at Grove City, in the county of Mercer and State of Pennsylvania, have invented new and useful Improvements in Focusing Devices, of which the following is a specification.

This invention relates to a device which is intended to comprise a part of a camera, particularly those of the less expensive type to enable a photographer to determine whether or not the camera is properly focused when taking a picture.

The primary object of the invention is to provide a device of this character which is in the form of a periscope which is so constructed and mounted in the box of the camera that when the device is in normal or focusing position the image of the object to be photographed will be refracted into the periscope by the lens of the camera if the shutter is open.

Another object of the invention is to so mount the focusing device within the box of the camera that when the camera is properly focused the focusing device may be moved to a position in which it will not interfere with the refraction of the image upon the surface upon which the exposure is to be made.

With these and other objects in view the invention resides in the novel combination and arrangement of parts which will be hereinafter described and particularly pointed out in the claims.

In the drawings:

Figure 1 is a perspective view of a camera equipped with a focusing device constructed in accordance with the invention and shown in raised position.

Fig. 2 is a longitudinal sectional view through the camera and focusing device which is shown in focusing position.

Fig. 3 is a cross section on the line 3—3 of Fig. 2.

Fig. 4 is a perspective view of the focusing device.

Like characters of reference denote the corresponding parts throughout the several views in the drawings.

Referring now to the drawing in detail wherein there has been shown a camera A of the folding film type equipped with a focusing device B constructed in accordance with the invention.

To permit the focusing device to be used in connection with the camera A the box 10 of the camera has formed in the top thereof a longitudinally extending recess which is arranged contiguous to the box cover 11 to provide the box with a slot 12 which has communicating therewith between its ends an opening 13 in said side wall of the box. The opposing walls of the respective spool chambers in the box 10 are provided with longitudinally extending slots 14 which are in line with the terminals of the slot 12.

The focusing device B includes a plate 15 which extends within the slots 14 and above the top of the box through the slot 12 therein. The plate 15 prevents the surface upon which an exposure is to be made from becoming injured by the light when the focusing device is in use and also serves as a holder for a tube 16. The tube 16 extends from the bottom to the top of the plate 15 and is provided between its ends with an opening 17 which when the plate 15 is in position to exclude light from a sensitive surface behind the plate registers with the lens in the camera A. A mirror 18 is arranged within the tube 16 contiguous to the opening 17 and at an acute angle to an image receiving plate 19 extending transversely of the tube adjacent the top of the opening 17. The plate 19 is preferably a piece of ground glass, so that when the plate 15 is in lowered position and the shutter of the camera open, the image of the object to be photographed will be refracted by the lens of the camera upon the mirror which will reflect the image upon the plate 19.

To permit the plate 15 to be received and lowered within the box of the camera A the top of the plate 15 has connected therewith a finger piece 20 which when the plate 15 is in lowered position covers the slot 12. The tube 16 is provided at its upper end with a plain glass 21 which when the plate 15 is in lowered position underlies a hinged cover 22 for the opening 13 in the top of the box 10. When it is desired to employ the device B to focus the camera A and the plate 15 is in normal position the cover 22 is raised and the shutter of the camera open, so that the operator may be gazing into the tube 16 through the plain glass 21, determine when the object to be photographed is clearly and sharply defined upon the plate 19. When the photographer is satisfied that the camera is properly focused the shutter of the camera is closed and the plate 15 moved to raised position so that the strip 23 at the bottom of the plate 15 will prevent any light from passing between the focusing device and the openings in the top of the camera box.

Having thus described the invention what is claimed as new, is:

1. A camera having an opening in the top thereof, a vertical movable plate in the camera extending within said opening, means carried by the lower end of the plate for engaging the under side of the top of the camera casing at the edges of the slot and opening, an open top tube on said plate having an opening therein between its ends, inclined image reflecting means in said tube in the rear of said opening, and image defining means in said tube adjacent said opening and image reflecting means.

2. A camera having a slot in the top thereof, and an opening communicating with said slot, a movable plate within the camera extending within said slot, a finger piece on said plate overlying said slot, image delineating means on said plate extending within said opening, and a cross piece adjacent the bottom of said plate in line with said opening and slot.

In testimony whereof we affix our signatures.

LE ROY D. SHAFER.
LESTER J. BOLLINGER.